United States Patent Office 3,493,311
Patented Feb. 3, 1970

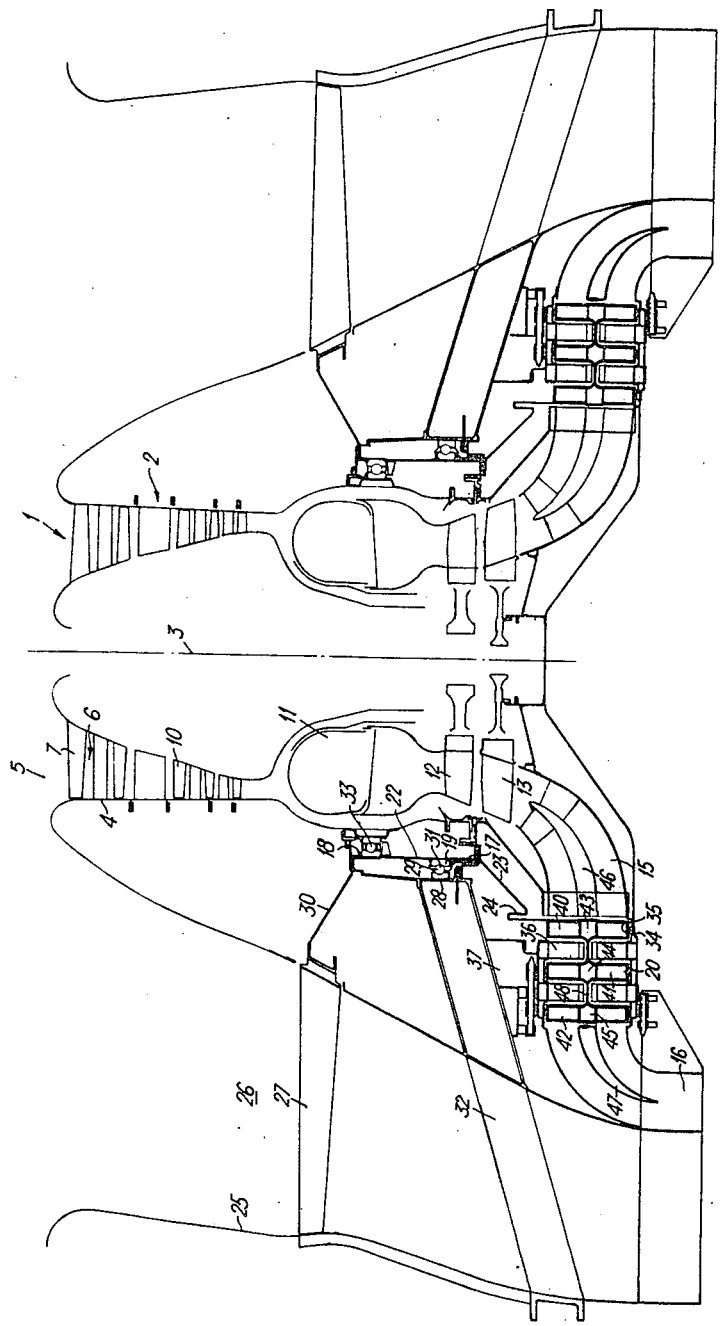

3,493,311
ROTARY BLADED FLUID FLOW MACHINE,
E.G., A FAN LIFT ENGINE
Charles William Robey, Kings Newton, England, assignor to Rolls-Royce Limited, Derby, England, a British company
Filed Sept. 17, 1968, Ser. No. 760,214
Claims priority, application Great Britain, Oct. 6, 1967, 45,906/67
Int. Cl. F01d *5/04*
U.S. Cl. 415—119                                9 Claims

ABSTRACT OF THE DISCLOSURE

A gas turbine engine has a duct within a portion of which there is disposed a row of turbine rotor blades. The turbine rotor blades extend axially from opposite sides of a central ring which has a drive connection to a rotatable shaft disposed externally of the duct. The central ring member is supported solely by its connection to the shaft.

---

This invention concerns a rotary bladed fluid flow machine such, for example, as a fan lift engine.

The term "lift engine" as used in this specification is intended to indicate an engine adapted to produce vertical lift forces on an aircraft independently of those generated aerodynamically by forward flight of the aircraft.

According to the present invention, there is provided a rotary bladed fluid flow machine having a duct within a portion of which there is disposed a row of turbine rotor blades, the turbine rotor blades extending axially from opposite sides of a central ring member which is arranged coaxially of and has a drive connection to a rotatable shaft disposed externally of the duct to drive the latter, the central ring member being supported solely by its connection to the shaft, and the said duct portion extending radially of the axis of the shaft.

The provision of the central ring member ensures that centrifugal and gas forces acting on the rotor blades will produce relatively little net torque acting on the central ring member, so that it will not be necessary to provide an unduly sturdy, and therefore, heavy, structure to support the rotor blades.

There may be disposed within the duct at least one further row of turbine rotor blades, the blades of the or each said row extending from a central ring member, the central ring members of all the said rows being interconnected.

The said drive connection is preferably a radially flexible connection, e.g., a "hairpin" connection.

Fairings may be mounted within the duct on opposite sides respectively of the row or rows, the fairings guiding fluid flowing through the duct onto or from the blades so as to diminish the effect of the obstruction caused by the or each central ring member.

The fairings may carry sound damping material. Moreover, at least one of the fairings may extend through a curved portion of the duct and helps to guide the fluid smoothly therethrough.

The said row or rows may form part of a radially extending free turbine of a gas turbine device.

The said shaft may drive a fan.

The invention is illustrated, merely by way of example, in the accompanying drawing, which is a sectional view of a fan lift engine in accordance with the present invention.

Referring to the drawing, a fan lift engine 1 includes a gas turbine gas generator 2 arranged about a vertical axis 3. The gas generator 2 has a casing 4 at whose upper end there is an air inlet 5. The casing 4 forms the outer wall of an annular flow duct 6 within which there are arranged in flow series a low pressure compressor 7, a high pressure compressor 10, combustion equipment 11, a high pressure turbine 12 and a low pressure turbine 13.

Downstream of the low pressure turbine 13 the flow duct 6 has a curved duct portion 15 a part of which extends substantially radially, the duct portion 15 merging into a curved duct portion 16 a part of which extends axially to the downstream end of the flow duct 6.

Mounted in the radially extending part of the duct portion 15 is a free turbine 20. The free turbine 20, which is described in greater detail below, and which is thus driven by the exhaust gases of the gas turbine gas generator 2, drives a rotatable shaft 22 by way of drive connecting structure 23 having a radially flexible "hairpin" section 24, the drive connecting structure 23 being drivingly connected to the lower end portion 17 of the shaft 22.

The shaft 22 extends parallel to the axis 3, i.e., axially of the engine 1.

The engine 1 has a substantially cylindrical fixed outer casing 25 which forms the outer casing of a fan duct 26. Mounted within the fan duct 26 is a fan 27 which is driven by the axially extending rotatable shaft 22 by way of frusto-conical structure 30, the frusto-conical structure 30 being drivingly connected to the upper end portion 18 of the shaft 22.

As will be seen from the drawing, the shaft 22 is disposed in the space between the annular flow duct 6 and the fan duct 26. The shaft 22, which is thus disposed radially inwardly of and spaced from the outer casing 25, is supported from the latter solely by virtue of being mounted within and supported by an inner race 19 of a bearing 31. The bearing 31 has an outer race 28 which is spaced from the inner race 19 by balls 29 which are in rolling contact with the races 19, 28, the outer race 28 being itself carried by substantially radially extending struts 32 secured to the outer casing 25. The struts 32, which are disposed between the fan 27 and the free turbine 20, are not necessarily disposed perfectly radially but may, for example, as shown extend from the outer casing 25 in a direction towards the air inlet 5 of the engine 1.

The bearing 31 is disposed outwardly of and adjacent the lower end portion 17 of the shaft 22, the bearing 31 being disposed in a plane which contains the centre of gravity of the combined fan 27 and gas generator 2. A bearing 33 is mounted within the shaft 22 adjacent the upper end portion 18 thereof, the bearing 33 being disposed in a plane containing the centre of gravity of the gas generator 2. The casing 4 of the gas turbine gas generator 2 is mounted within the bearing 33 and is supported thereby, the bearing 33 providing for relative rotation between the shaft 22 and the gas turbine gas generator 2.

In order to prevent actual rotation of the gas turbine gas generator 2, the latter is provided with dogs 34 which engage with dogs 35 on a stator part 36 of the free turbine 20, the stator part 36 being connected by structure 37 to the struts 32. The dogs 34, 35, need only provide a relatively light restraint of the gas turbine gas generator 2. Thus the gas turbine gas generator 2 is prevented from rotating by being connected via the dogs 34, 35, the stator part 36, the structure 37 and the struts 32, to the fixed outer casing 25.

As will be appreciated, the mounting of the gas turbine gas generator 2 in the manner described above is very much lighter than the alternative of mounting the gas generator within a sturdy cylindrical structure which would be supported from the outer casing both by the struts 32 and by axially extending members extending from said struts.

Thus the shaft 22, within which the gas generator 2 is mounted, is itself supported solely by the single bearing 31. This is possible because the bearing 31 is of exceptionally large diameter when compared, for instance, with the bearings (not shown) of the high and low pressure shafts (not shown) of the gas generator 2. Therefore any small clearances in the bearing 31 would permit only very slight pivotal movement of the shaft 22, and even these small clearances are taken up when the fan 27 is running by the large aerodynamic axial load imparted by the fan 27 to the shaft 22.

Normally, it would be impossible to use such a large diameter bearing 31 because, as the bearing diameter increases, so the tracking speed of the balls 29 of the bearing also increases for any given rotational speed of the shaft. In the present case, however, in order to reduce noise, the speed of the fan 27 is kept low and therefore the bearing 31 does not have to cater for high rotational speeds, and a large diameter bearing can therefore be used with the advantages set out above.

The free turbine 20 consists of three rows 40, 41, 42 of rotor blades arranged within the duct portion 15. The rotor blades of the rows 40, 41, 42 extend axially from opposite sides of central ring members 43, 44, 45, each of the central ring members 43, 44, 45 being a solid, non-tubular metal member which is arranged coaxially of the gas generator 2 and thus parallel to the shaft 22.

The central ring member 43 is connected to the structure 23 to drive the latter and so drive the shaft 22. The central ring member 43 is not provided with any bearings and is in fact supported solely by its connection, via the structure 23, to the shaft 22. The central ring members 44, 45 are also not supported by any bearing structure, the central ring members 43, 44, 45 being interconnected. The interconnection between the central ring members 43–45 forms a solid disc-like metal member 48 which is disposed in a plane substantially perpendicular to the axis of the shaft 22.

As will be appreciated, the loads due to centrifugal forces and the gas loads on the upper portions of the blades of the rows 40–42 will tend to twist the latter about their central ring members 43–45 so as to impart a counterclockwise torque thereto. This counterclockwise torque will, however, be substantially balanced by a clockwise torque which will be imparted by reason of the loads due to centrifugal forces and the gas loads acting on the lower portions of the blades of the rows 40–42. Thus the provision of central ring members 43–45, as opposed to the alternative of providing connections between the rows 40–42 at either their upper or lower ends, tends to compensate for the effect of the said centrifugal and gas loads. Furthermore, by reason of this balancing-out of forces, it is possible to provide a lighter mounting for the rows 40–42 than would otherwise be possible. This is because if rings were mounted at either of the extremities of the rotor blades they would experience a torque in one sense only and would have to be made sufficiently strong to withstand this torque.

Mounted within the duct portion 15 is a fairing 46 which is disposed on the upstream side of the free turbine 20, while a fairing 47, which is disposed in the duct portion 16, is arranged on the downstream side of the free turbine 20. The fairing 46 both helps to guide the fluid flow smoothly through the duct portions 15 and also helps to guide the fluid onto the blades of the rows 40–42 so as to diminish the effect of the obstruction caused by the central ring members 43–45. The fairing 47 similarly guides the fluid leaving the row 42 so as to turn this fluid through substantially 90° and so to diminish the effect of the obstruction caused by the central ring member 45.

If desired, the fairings 46, 47 may carry sound damping material (not shown).

I claim:

1. A rotary bladed fluid flow machine having a duct, a row of turbine rotor blades disposed within a portion of said duct, a central ring member having the turbine rotor blades extending axially from opposite sides thereof, a rotatable shaft disposed externally of the duct, the central ring member being arranged coaxially of and having a drive connection to said rotatable shaft to drive the latter, the central ring member being supported solely by its connection to the shaft, and the said duct portion extending radially of the axis of the shaft.

2. A fluid flow machine as claimed in claim 1 in which there is disposed within the duct at least one further row of turbine rotor blades, the blades of the or each said row extending from a central ring member, the central ring members of all the said rows being interconnected.

3. A fluid flow machine as claimed in claim 1 in which the said drive connection is a radially flexible connection.

4. A fluid flow machine as claimed in claim 3 in which the flexible connection is a "hairpin" connection.

5. A fluid flow machine as claimed in claim 1 in which fairings are mounted within the duct on opposite sides respectively of the row or rows, the fairings guiding fluid flowing through the duct onto or from the blades so as to diminish the effect of the obstruction caused by the or each central ring member.

6. A fluid flow machine as claimed in claim 5 in which the fairings carry sound damping material.

7. A fluid flow machine as claimed in claim 5 in which at least one of the fairings extends through a curved portion of the duct and helps to guide the fluid smoothly therethrough.

8. A fluid flow machine as claimed in claim 1 in which the said row or rows form part of a radially arranged free turbine of a gas turbine device.

9. A fluid flow machine as claimed in claim 1 in which the said shaft drives a fan.

References Cited

UNITED STATES PATENTS

| 2,102,637 | 12/1937 | Meininghaus | 253—79 |
| 2,115,031 | 4/1938 | Meininghaus | 253—94 |

FOREIGN PATENTS

| 544,294 | 2/1932 | Germany. |
| 724,164 | 8/1942 | Germany. |

EVERETTE A. POWELL, Jr., Primary Examiner

U.S. Cl. X.R.

415—122, 198